US012671600B2

(12) United States Patent
Eastlake

(10) Patent No.: US 12,671,600 B2
(45) Date of Patent: **\*Jun. 30, 2026**

(54) METHOD FOR IMPROVED HASH CHAINING AUTHENTICATION

(71) Applicant: HUAWEI TECHNOLOGIES CO., LTD., Shenzhen (CN)

(72) Inventor: Donald E. Eastlake, Apopka, FL (US)

(73) Assignee: Huawei Technologies Co., Ltd., Shenzhen (CN)

( \* ) Notice: Subject to any disclaimer, the term of this patent is extended or adjusted under 35 U.S.C. 154(b) by 126 days.

This patent is subject to a terminal disclaimer.

(21) Appl. No.: 18/356,707

(22) Filed: Jul. 21, 2023

(65) Prior Publication Data

US 2023/0362022 A1      Nov. 9, 2023

Related U.S. Application Data

(63) Continuation of application No. PCT/US2022/013400, filed on Jan. 21, 2022.

(60) Provisional application No. 63/140,677, filed on Jan. 22, 2021.

(51) Int. Cl.
| | |
|---|---|
| *H04L 101/622* | (2022.01) |
| *H04L 9/00* | (2022.01) |
| *H04L 9/08* | (2006.01) |
| *H04L 9/32* | (2006.01) |
| *H04L 61/5092* | (2022.01) |

(52) U.S. Cl.
CPC .............. *H04L 9/50* (2022.05); *H04L 9/0869* (2013.01); *H04L 9/3213* (2013.01); *H04L 61/5092* (2022.05); *H04L 2101/622* (2022.05)

(58) Field of Classification Search
CPC ....... H04L 9/50; H04L 9/0869; H04L 9/3213; H04L 61/5092; H04L 2101/622; H04L 9/3239
See application file for complete search history.

(56) References Cited

U.S. PATENT DOCUMENTS

| | | | |
|---|---|---|---|
| 2006/0036548 A1\* | 2/2006 | Roever | G06F 21/10 |
| | | | 705/51 |
| 2007/0150744 A1\* | 6/2007 | Cheng | G06F 21/335 |
| | | | 713/183 |

(Continued)

FOREIGN PATENT DOCUMENTS

WO      WO-2019129417 A1 \*   7/2019

OTHER PUBLICATIONS

Droms, R., "Dynamic Host Configuration Protocol," Network Working Group, RFC 2131, Mar. 1997, 45 pages.

(Continued)

*Primary Examiner* — Andrew Suh
(74) *Attorney, Agent, or Firm* — Conley Rose, P.C.

(57) ABSTRACT

A method for authenticating messages implemented by a sending device. The method includes the sending device sending a first message that includes an N generation token of a first seed, where N is a first integer value greater than one. The method further includes the sending device sending a second message that includes an N−1 generation token of the first seed and an M generation token of a second seed, where M is a second integer value greater than one, and where the N−1 generation token is a different generation than the M generation token.

30 Claims, 3 Drawing Sheets

(56)                References Cited

U.S. PATENT DOCUMENTS

| 2009/0138712 | A1* | 5/2009 | Driscoll | .................... | H04L 9/12 |
| | | | | | 713/170 |
| 2012/0011566 | A1* | 1/2012 | Youm | .................... | H04L 9/083 |
| | | | | | 726/3 |
| 2013/0238903 | A1* | 9/2013 | Mizunuma | .............. | G06F 21/31 |
| | | | | | 713/176 |
| 2014/0173682 | A1* | 6/2014 | Xiao | .................... | H04W 12/06 |
| | | | | | 726/1 |
| 2014/0250517 | A1* | 9/2014 | Kim | .................... | G06V 40/197 |
| | | | | | 726/7 |
| 2015/0149779 | A1* | 5/2015 | Falk | ..................... | H04L 9/0866 |
| | | | | | 713/171 |
| 2016/0080380 | A1* | 3/2016 | Dawoud Shenouda Dawoud | ...... | |
| | | | | | H04L 9/3265 |
| | | | | | 713/156 |
| 2018/0212779 | A1* | 7/2018 | Bergmann | ............ | H04L 9/3247 |
| 2018/0234248 | A1* | 8/2018 | Imamoto | ............ | H04L 63/0428 |
| 2020/0374295 | A1* | 11/2020 | Palumbo | .............. | H04L 9/3236 |
| 2021/0135858 | A1* | 5/2021 | Chu | ..................... | H04L 63/061 |

OTHER PUBLICATIONS

Eastlake, D., III, et al., "Randomness Requirements for Security," Network Working Group, RFC 4086, Jun. 2005, 48 pages.
Eastlake, D., III, et al., "IANA Considerations and IETF Protocol and Documentation Usage for IEEE 802 Parameters," Internet Engineering Task Force (IETF), RFC 7042, Oct. 2013, 27 pages.
Mrugalski, T., et al., "Dynamic Host Configuration Protocol for IPV6 (DHCPv6)," Internet Engineering Task Force (IETF), RFC 8415, Nov. 2018, 154 pages.
Volz, B., et al., "Link-Layer Address Assignment Mechanism for DHCPv6," Internet Engineering Task Force (IETF), RFC 8947, Dec. 2020, 18 pages.
Bernardos, CJ., et al., "Structured Local Address Plan (SLAP) Quadrant Selection Option for DHCPv6," Internet Engineering Task Force (IETF), RFC 8948, Dec. 2020, 13 pages.
De La Olivia, A., et al., "Protocol for Assignment of Local and Multicast Addresses (PALMA)," Interdigital, UC3M, IEEE 802. 1CQ, Jun. 30, 2020, 18 pages.
Lamport, L., "Password Authentication with Insecure Communication," SRI International, Communications of the ACM. Vol. 24, No. 11, Nov. 1981, 3 pages.
"Federal Information Processing Standards Publication Secure Hash Standard (SHS)," FIPS Pub 180-4, Information Technology Laboratory National Institute of Standards and Technology Gaithersburg, MD 20899-8900, Aug. 2015, 36 pages.
Hu, C.H., et al., "Efficient Constructions for One-way Hash Chains," ACNS 2005, LNCS 3531, pp. 423-441.
Zhao, Y., et al., "An Improved Elegant Method to Re-initialize Hash Chains," Department of Information Engineering, Beijing University of Posts and Telecommunications, Jan. 18, 2005, 8 pages.
"Information Technology—Open Systems Interconnection—Base Reference Model: The Basic Model" ISO/IEC 7498-1, Second Edition Nov. 15, 1994, 6 pages.
"T/Key: Second-Factor Authentication From Secure Hash Chains," arXiv:1708/08424v1, CCS '17, Oct. 30-Nov. 3, 2017, 17 pages.

* cited by examiner

METHOD FOR IMPROVED HASH CHAINING AUTHENTICATION

CROSS-REFERENCE TO RELATED APPLICATION

This application is a continuation of International Patent Application No. PCT/US2022/013400 filed on Jan. 21, 2022, by Futurewei Technologies, Inc., and titled "Method for Improved Hash Chaining Authentication," which claims the benefit of U.S. Provisional application 63/140,677 filed on Jan. 22, 2021, which is hereby incorporated by reference in its entirety.

TECHNICAL FIELD

The present disclosure is generally related to network management, and in particular to various embodiments of systems and methods that improve hash chaining authentication.

BACKGROUND

A hash function is any function that can be used to map data of variable-length size to fixed-size values and is not invertible. The values returned by a hash function are called hash values, hash codes, digests, or simply hashes. It is common for the length of the output of a hash function to be a multiple of 8-bit bytes since modern computers are typically more efficient at processing 8-bit bytes or multiples thereof. The values may be used to index a fixed-size table called a hash table. Hash chains, that is a series of values produced by iterating a hash function, can be used to authenticate the source of a series of messages.

SUMMARY

A first aspect relates to a method for authenticating messages implemented by a sending device. The method includes the sending device sending a first message that includes an N generation token of a first seed, wherein N is a first integer value greater than one. The method further includes the sending device sending a second message that includes an N−1 generation token of the first seed and an M generation token of a second seed, wherein M is a second integer value greater than one, and wherein the N−1 generation is a different generation than the M generation.

Optionally, in a first implementation according to the first aspect, the method further includes the sending device, prior to sending the first message, generating the N−1 generation token and the N generation token of the first seed by performing hash chaining using the first seed; and storing the N−1 generation token.

Optionally, in a second implementation according to the first aspect or any implementation thereof, the method further includes the sending device, prior to sending the second message, generating an M−1 generation token and the M generation token of the second seed by performing hash chaining using the second seed; and storing the M−1 generation token.

Optionally, in a third implementation according to the first aspect or any implementation thereof, wherein the first integer value of N is equal to the second integer value of M.

Optionally, in a fourth implementation according to the first aspect or any implementation thereof, the method further includes the sending device sending, when N is greater than two and M is greater than two, a third message that includes an N−2 generation token of the first seed and the M−1 generation token of a second seed.

Optionally, in a fifth implementation according to the first aspect or any implementation thereof, the method further includes the sending device, prior to sending the third message, generating an N−3 generation token and the N−2 generation token of the first seed by performing hash chaining using the first seed; and storing the N−3 generation token.

Optionally, in a sixth implementation according to the first aspect or any implementation thereof, the method further includes the sending device generating, when N is two and M is two, an N−1 generation token and an N generation token of a third seed by performing hash chaining using the third seed; sending a third message that includes the M−1 generation token of the second seed and the N generation token of the third seed; and storing the N−1 generation token of the third seed.

Optionally, in a seventh implementation according to the first aspect or any implementation thereof, the method further includes the sending device overwriting or deleting any previously stored generation token that has been included in a sent message.

A second aspect relates to a method for authenticating messages implemented by a receiving device. The method includes the receiving device receiving, from a sending device, a first message that includes an N generation token of a first seed, wherein N is a first integer value greater than one. The method includes the receiving device storing the N generation token of the first seed. The method also includes the receiving device receiving a second message that includes an N−1 generation token of the first seed and an M generation token of a second seed, wherein M is a second integer value greater than one, and wherein the N−1 generation is a different generation than the M generation. The method further includes the receiving device determining whether a hash value of a hash of the N−1 generation token is equal to the N generation token of the first seed received in the first message; and authenticating the second message came from the sending device when the hash value of the hash of the N−1 generation token is equal to the N generation token received in the first message.

Optionally, in a first implementation according to the second aspect, the method further includes the receiving device discarding the second message when the hash value of the hash of the N−1 generation token is not equal to the N generation token received in the first message.

Optionally, in a second implementation according to the second aspect or any implementation thereof, the method further includes the receiving device storing the M generation token of the second seed when the hash value of the hash of the N−1 generation token is equal to the N generation token received in the first message.

Optionally, in a third implementation according to the second aspect or any implementation thereof, the method further includes the receiving device deleting or overwriting the N generation token of the first seed from memory when the hash value of the hash of the N−1 generation token is equal to the N generation token received in the first message.

Optionally, in a fourth implementation according to the second aspect or any implementation thereof, the first integer value of N is equal to the second integer value of M.

Optionally, in a fifth implementation according to the second aspect or any implementation thereof, the method further includes the receiving device receiving, when N is greater than two and M is greater than two, a third message that includes an N−2 generation token of the first seed and an M−1 generation token of the second seed. The method also includes the receiving device determining whether the hash value of the hash of the M−1 generation token is equal to the M generation token; and authenticating the third message came from the sending device when the hash value of the hash of the M−1 generation token is equal to the M generation token.

Optionally, in a sixth implementation according to the second aspect or any implementation thereof, the method further includes the receiving device storing the N−2 generation token of the first seed for authenticating a fourth message from the sending device.

A third aspect relates to an apparatus comprising a memory configured to store instructions; and a processor coupled to the memory and configured to execute the instructions, which when executed causes the apparatus to perform the method according to the first aspect or any implementation thereof.

A fourth aspect relates to an apparatus comprising a memory configured to store instructions; and a processor coupled to the memory and configured to execute the instructions, which when executed causes the apparatus to perform the method according to the second aspect or any implementation thereof.

BRIEF DESCRIPTION OF DRAWINGS

To describe the technical solutions in the embodiments of the present disclosure more clearly, the following briefly describes the accompanying drawings for describing the embodiments. It is clear that, the accompanying drawings in the following description show merely some embodiments of the present disclosure, and an ordinary person skilled in the art may derive other drawings from these accompanying drawings.

DESCRIPTION OF EMBODIMENTS

Figure 1:
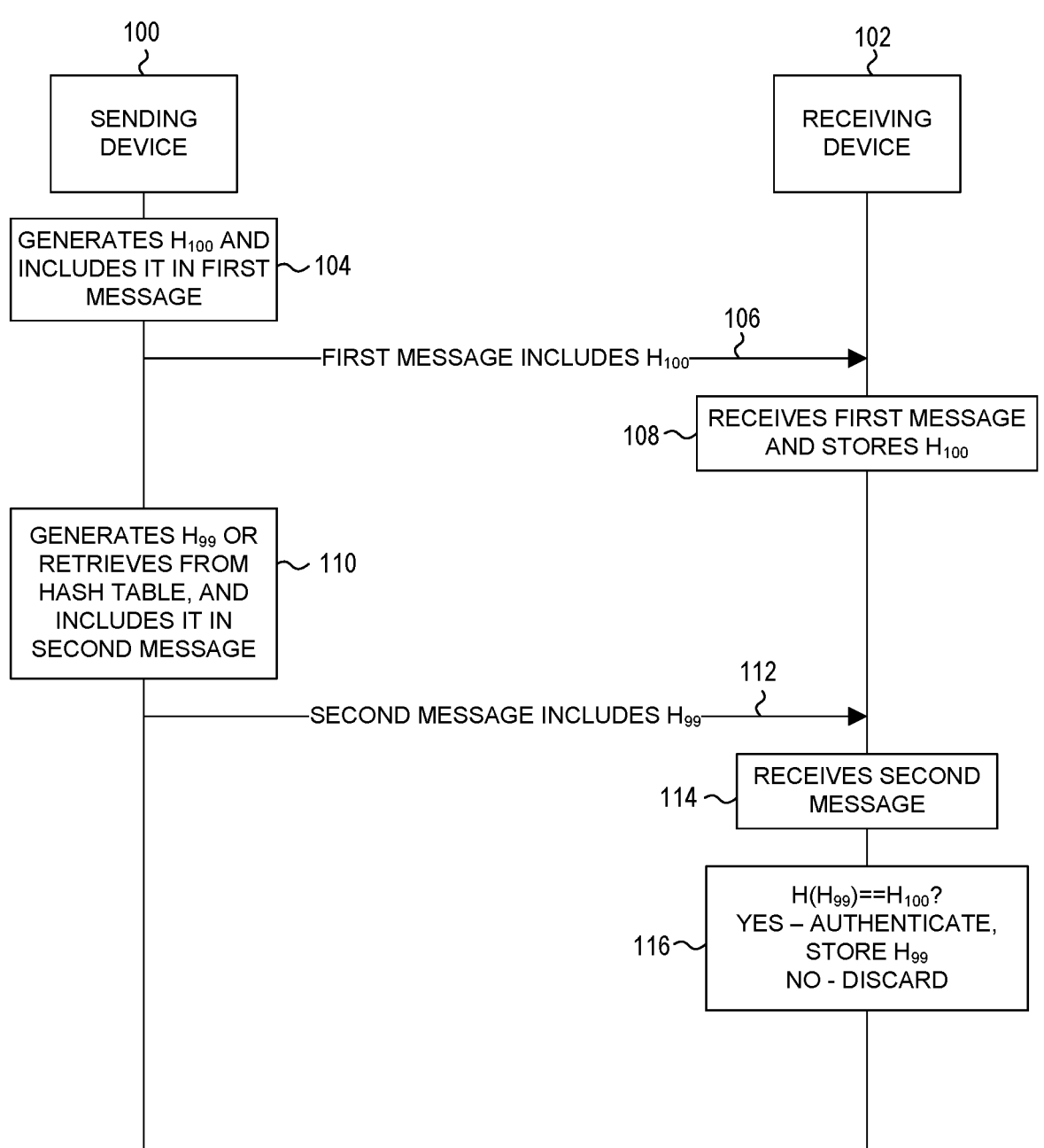
FIG. 1 is a schematic diagram illustrating hash chaining authentication process according to an embodiment of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure provides various embodiments of systems and methods that improve hash chaining for authenticating messages sent from a sending device. In particular, the disclosed embodiments provide for the inclusion of two different number-generation hash chain tokens based on two different seeds in some or all messages. For example, the first hash chain token could be a first-generation hash chain token using seed A and the second hash chain token could be a second-generation hash chain token using seed B. The two hash chain tokens can be used to authenticate/verify messages sent from a sending device. The disclosed embodiments reduce or eliminate the storage and/or computation burden on the sending device when hash chain tokens are used for authenticating messages from the sending device. For instance, the inclusion of two hash chain tokens of different number generations for their seed value eliminates the need for large storage or quadratic computation load at the sending device to authenticate messages against off-path attackers.

As referenced herein, a generation is an application of the hash function. For example, a first-generation means that the hash function has been applied once to obtain a hash value, a second-generation means that the hash function has been applied twice to obtain a second-generation hash value (e.g., a hash of the first-generation hash value produces a second-generation hash value), an $N^{th}$-generation means the hash function has been applied N times to obtain an $N^{th}$-generation hash value, where N is an integer value greater than one. Similarly, an $M^{th}$-generation means the hash function has been applied M times to obtain an $M^{th}$-generation hash value, where M is an integer value greater than one. In some embodiments, the integer values of N and M can be the same value or can be different values.

In general, a goal of hash functions is that the output of the hash functions be relatively easy to calculate, but infeasible to invert. For the given equation, H=Hash (X), H is the output of a hash function applied to the bit string X as input. Using a hash function, H is relatively easy to calculate given X. However, it is infeasible to find the bit string X given H. For instance, strong hash functions combine and use all the input bits so typically if even one bit of input is changed, about half the output bits of the hash functions changes. An example of a strong hash function is the Secure Hash Algorithm (SHA) approved by the National Institute of Standards and Technology (NIST).

In addition, a hash function can be applied recursively where the output of a hash can be used as an input of the same hash function. A hash chain is the series of values obtained by repeatedly applying a hash function, so if:

$$H_1 = \text{Hash}(X)$$

$$H_2 = \text{Hash}(H_1) = \text{Hash (Hash}(X))$$

and generally $$H_N = \text{Hash}(H_{N-1}) = \text{Hash(Hash ( . . . (Hash } (X)) . . . ))$$

that is, $H_N$ is the result of applying the function Hash N times recursively, the sequence $H_N$, $H_{N-1}$, . . . , $H_2$, $H_1$ constitutes a hash chain.

Due to the fact that it is infeasible to find the bit string X given H as described above, a hash chain can be used for authenticating messages from a sending device. For example, referring to FIG. 1, assume that a sending device 100 is configured to send a sequence of messages to a receiving device 102. The receiving device 102 wants to be sure that the messages come from the sending device 100. The sending device 100 and the receiving device 102 both know the hash function to use and how to find the hash token in a message based on a prior agreement, configuration, or because both the sending device 100 and the receiving device 102 are utilizing a standard concerning the messages they are exchanging or the like.

At step 104, the sending device 100 starts by creating a random seed S (i.e., a random string of bits) and calculates a hash chain. For example, the hash chain can be of size 100, where $H_{100}$ is the result of applying a strong hash function to S one hundred times recursively as described above. The hash chain can be of any size greater than one. The sending device 100 then includes the value of $H_{100}$ in a first message. At step 106, the sending device 100 sends the first message that includes the value of $H_{100}$ to the receiving device 102. The hash value included in the message is referred to herein as a token or a hash token.

At step 108, when the receiving device 102 receives the first message, the receiving device 102 identifies the hash token in the message and stores the value of the hash token (in this case, the value of $H_{100}$) in memory.

When a second message is to be sent to the receiving device 102, the sending device 100, at step 110, has to either recompute the hash chain to obtain the value of $H_{99}$ (i.e., the result of applying the hash function to the seed S ninety-nine times recursively) or retrieve the value of $H_{99}$ from a hash table (if the sending device 100 has enough memory/storage capacity to have stored the results of all 100 hash values from the previous calculations in the hash table). The sending device 100 then includes the value of $H_{99}$ as a hash token in the second message.

At step 112, the sending device 100 sends the second message that includes the value of $H_{99}$ as the hash token to the receiving device 102. At step 114, the receiving device 102 receives the second message. At step 116, the receiving device 102 can verify the hash token by computing the hash of the hash token (i.e., Hash($H_{99}$)) and comparing the resulting value to the value of $H_{100}$ saved by the receiving device 102 from the first message. If the resulting value is the same as the value of $H_{100}$ saved by the receiving device 102 from the first message, then the receiving device 102 is assured that the sending device 100 is the sender of the second message. The receiving device 102 thus authenticates the second message as being sent from the sending device 100 and stores the value of $H_{99}$ for use in authenticating a next message from the sending device 100. If the resulting value is not the same as the value of $H_{100}$ saved by the receiving device 102 from the first message, then the receiving device 102 can discard or ignore the message.

As stated above, it is infeasible to find a value that will yield a particular hash. Thus, even when an adversary that observes the first message from the sending device 100 to the receiving device 102 or observes the value that the receiving device 102 has saved, the adversary cannot determine an $H_{99}$ to authenticate a new message. Generally, an adversary cannot learn or guess the original seed S (or, in general, any earlier value in the chain) because the sending device 100 can easily create a random seed S that is infeasible for an adversary to guess by deriving such seeds from a root random quantity with high entropy. Further, it is assumed that an adversary cannot modify messages in transit from the sending device 100 to the receiving device 102 or block such a message and steal an authentication token to use in forging an apparently authentic message. Thus, even if an adversary can observe the message that includes $H_{99}$ and was capable of sending a different message that includes $H_{99}$, the receiving device 102 would have received the intended message that includes $H_{99}$ from the sending device 100, and will be looking, in effect, for $H_{98}$ in the next authentic message.

There are many variations possible in the use of the above mechanism. For example, if the receiving device 102 can learn that the initial $H_{100}$ is from the sending device 100 in a secure way, then this can, for example, be used as a password mechanism, possibly authenticating sessions rather than messages. In addition, although the above example describes the receiving device 102 as a single entity, the messages from the sending device 100 could be sent to a group of receivers or even be a sequence of public messages. Additionally, it would also be possible for the receiving device 102 to also include a similar token in messages to the sending device 100 to verify that the messages are being sent by the receiving device 102, resulting in mutual or two-way authentication. The number of times the hash function is applied for the first token sent in the first message could be any number. Although, one hundred was used in the example above, the hash function could be applied two times, three times, ten times, one thousand times, or any other number. In some embodiments, if the initial seed S is the same size as the output of the hash function, the first application of Hash can be skipped, and S can be used directly as $H_1$. When a token is received in a message and authenticates that message, that token could be repeated in a response to, or acknowledgement of the message, as a proof of receipt.

In some embodiments, it is possible to compensate for a number of messages being lost or blocked in the network by having the receiver try multiple applications of the hash function. For example, assume the sending device 100 in its first message sends $H_{100}$ as the hash token, then in its second message send $H_{99}$, and in its third message sends $H_{98}$. In the event that the second message that includes $H_{99}$ as the hash token is lost in the network, the receiving device 102 receives the first message and remembers $H_{100}$, never receives the second message, and then receives the third message with $H_{98}$ as the hash token. When the receiving device 102 checks the hash token in the third message (which is the second message the receiving device 102 receives) by applying the hash function, the check will fail because the $H_{100}$ value the receiving device 102 has saved does not equal the hash of the hash token in the third message (Hash($H_{98}$)). In some embodiments, to compensate for a single lost message, if the initial check by the receiving device 102 fails, as in this example, the receiving device 102 could then try applying the hash function twice to the hash token in the received message (Hash(Hash($H_{98}$))). Doing so, the receiving device 102 would determine that the result matches its saved value of $H_{100}$. In general, to compensate for up to M lost messages, the receiving device 102 would need to apply the hash function to the received token once and if the result does not equal its stored value, apply hash twice and if that result fails, apply hash thrice, etc., up to applying the hash function M times. The value of M could be preconfigured, pre-negotiated, or part of a standard for exchanging messages between the sending device 100 and the receiving device 102. When the sending device 100 runs out of values by sending $H_1$, the process as described initially above would need to repeat with the sending device 100 picking a new seed S' and recursively apply the hash function to the new seed S'.

In some embodiments. the security of the authentication provided may be improved by having parts of the path over which the messages with tokens in them are sent integrity checked and/or encrypted, particularly any parts of the path with a significant probability of message tampering.

As described above, when sending subsequent messages, the sending device 100 has to either recompute the hash chain to obtain the value of $H_{99}$ (i.e., applying the hash function to the seed S ninety-nine times recursively) or if the sending device 100 has enough memory/storage capacity, the sending device 100 could store the results of all 100 hash values from the first time the hash calculations are performed in a hash table, and retrieve subsequent values from the hash table.

The sending device 100 can trade off storage against computation by electing to remember the entire sequence the sending device 100 originally computes ($H_1$, $H_2$, . . . , $H_{99}$, $H_{100}$ for example) so that the sending device 100 can easily send earlier sequential values in later sequential messages. In general, this requires that the sending device 100 allocate storage for all such values for all sequences of messages the sending device 100 is sending. Although the example uses 100 for the hash chain, it is possible that the sending device 100 may be sending thousands of messages or more, which would require even more storage capacity. Further, as connected devices such Internet of Things (IoT) devices become smaller and smaller, the space for memory in these devices may be limited.

Alternatively, the sending device 100 can save memory by just remembering the seed S (or $H_1$) and how many recursive applications of hash that was applied to produce the last hash token sent in the last message to the receiving device 102. Then, for the next message that is sent to the receiving device 102, the sending device 100 recursively applies the hash function one fewer times and remembers this reduced count. But this requires more computation because each time the sequence of hashes must be computed. If the first token the sending device 100 sends was the result of applying the hash function N times to S, using this strategy, the sending device 100 must apply the hash function N−1 times for the next token, N−2 times for the hash token after that, etc. Thus, if the sending device 100 ends up sending $H_1$, i.e., sending N tokens, the sending device 100 will have had to apply the hash function N+(N−1)+(N−2) . . . +1 times. In total, this will require applying the hash function N*(N−1)/2 or (N2−N)/2 times. Thus, the number of required applications of hash grows quadratically with this strategy.

There are also hybrid methods possible. For example, if the sending device 100 applies the hash function 1000 times, the sending device 100 could save every hundredth value. To determine a hash value, the sending device 100 could re-calculate any particular hash value in the sequence by applying the hash function at most 99 times to a value that was saved. This decreases the needed computation at the cost of some memory. Additionally, the sending device 100 cannot select an arbitrarily low value for the hash chain to reduce computation or storage because the sending device 100 would have to go through a new initialization process locally and with the receiving device 102 every time the sending device 100 reaches the beginning of the hash sequence, which would result in additional computation resources and time.

Any of the above options can represent a substantial burden in terms of memory or computation.

To address the above issues, and other issues, the present disclosure describes various systems and methods that improve hash chaining for authenticating messages sent from a sending device. In particular, the disclosed embodiments provide for the inclusion of two hash chain tokens of different number of generations based on two different seeds in some or all messages, which can be used to authenticate/verify messages are being sent from a sending device. The disclosed embodiments reduce or eliminate the storage and/or computation burden on the sending device when hash chain tokens are used for authenticating messages from the sending device.

The disclosed embodiments reduce the memory or hash computation requirements of the sending device 100 by increasing the size of a message to include two hash chain tokens of different number of generations based on two different seeds (e.g., a first-generation token of seed A, and a second-generation token of seed B). In particular, by sending two tokens in some or all messages as described below, the sending device 100 may avoid some or all of both the memory burden of storing the hash values and the computational burden of computing the hash values for each subsequent message.

Figure 2:
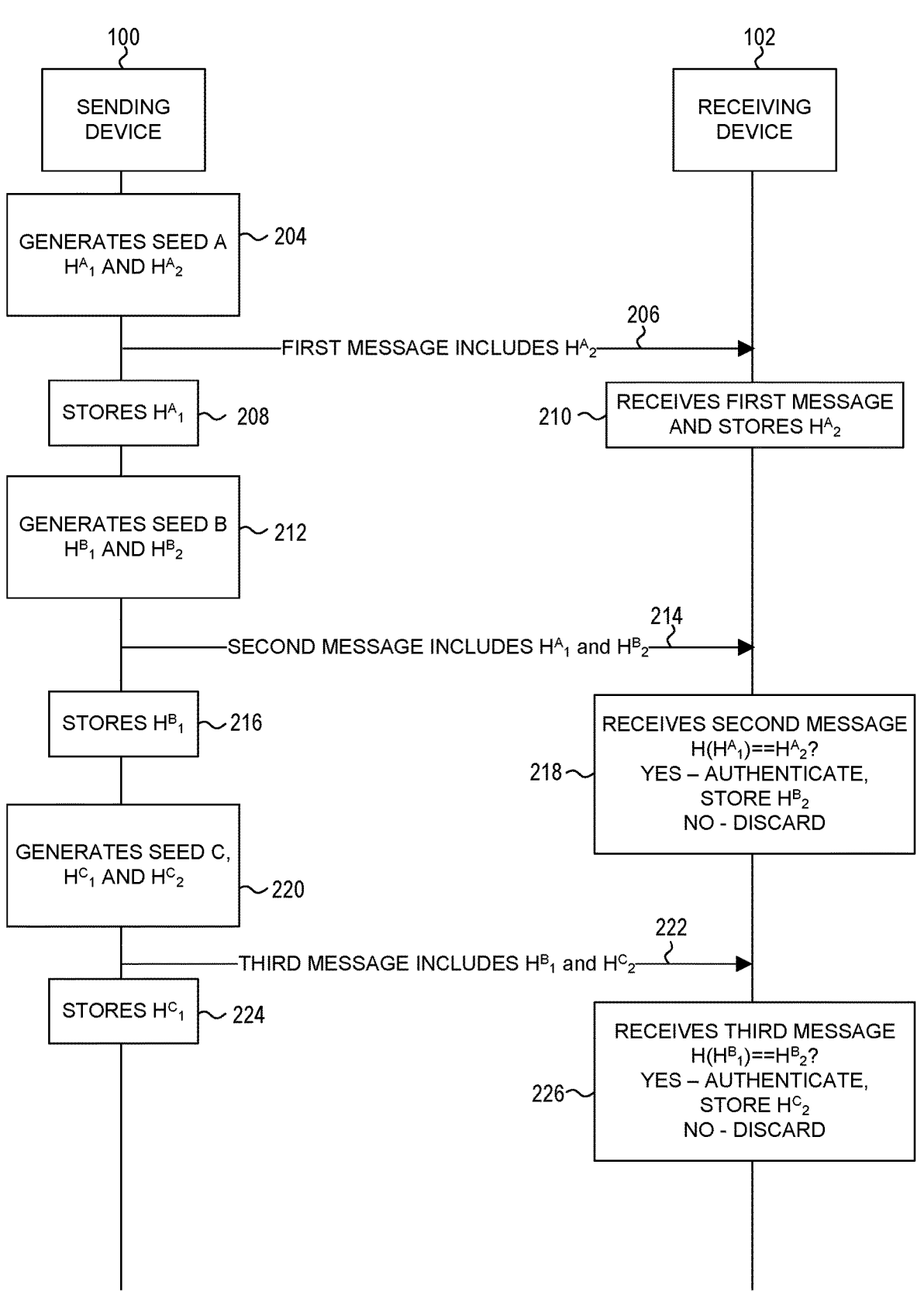
FIG. 2 is a schematic diagram illustrating an improved hash chaining authentication process according to an embodiment of the present disclosure.

As a simple example of an embodiment, referring to FIG. 2, the sending device 100, at step 204, generates a first seed (e.g., seed A). The sending device 100 hashes seed A to produce $H^A_1$. The A superscript means $H^A_1$ is a hash of seed A and the 1 subscript means $H^A_1$ is a first-generation hash. The sending device 100 then hashes the first-generation hash (i.e., $H(H^A_1)$) to produce a second-generation hash of seed A ($H^A_2$). At step 206, the sending device 100 includes $H^A_2$ as the hash token in a first message and sends the first message to the receiving device 102. At step 208, the sending device 100 stores $H^A_1$ for the second message. Although step 208 is shown as being performed after the first message is sent, the sending device 100 can store $H^A_1$ prior to sending the first message. At step 210, when the receiving device 102 receives the first message, the receiving device 102 stores $H^A_2$ so $H^A_2$ can be used to authenticate a next message from the sending device 100.

For a second message, the sending device 100, at step 212, generates a second seed (e.g., seed B), and hashes seed B to produce $H^B_1$. Similarly, the B superscript means $H^B_1$ is a hash of seed B and the 1 subscript means $H^B_1$ is a first-generation hash. The sending device 100 then hashes the first-generation hash (i.e., $H(H^B_1)$) to produce a second-generation hash of seed B ($H^B_2$). At step 214, the sending device 100 includes both $H^A_1$ and $H_B^2$ as hash tokens in the second message and sends the second message to the receiving device 102. At step 216, the sending device 100 stores $H_B^1$ for the third message. The sending device 100 can delete or overwrite the previously stored hash value (e.g., $H^A_1$) once the previously stored hash value has been included in a sent message to conserve memory resources. At step 218, when the receiving device 102 receives the second message, the receiving device 102 hashes $H^A_1$ from the second message (i.e., $H(H^A_1)$) and compares the hash value to the hash value of $H^A_2$ stored in memory. When the two hash values are the same, the receiving device 102 authenticates the second message as being sent from the same sender of the first message. The receiving device 102 stores $H^B_2$ so $H^B_2$ can be used to authenticate a next message from the sending device 100. In an embodiment, when the two hash values are not the same, the receiving device 102 discards the second message because the second message cannot be authenticated as being sent from the same sender of the first message. The receiving device 102 can delete or overwrite the previously stored hash value (e.g., $H^A_2$) once the previously stored hash value has been used to authenticate a sent message to conserve memory resources.

For a third message, the sending device 100, at step 220, has to generate a third seed (e.g., seed C) because the hash chain of seed A has reached the seed (i.e., all the hashes of seed A in the hash chain have been used). The sending device 100 hashes seed C to produce $H^C_1$, and hashes $H^C_1$ to produce $H^C_2$. The sending device 100 then includes both $H^C_2$ and $H^B_1$ as hash tokens in the third message and sends the third message to the receiving device 102. The sending device 100 stores $H^C_1$ for the next message. When the receiving device 102 receives the third message, the receiving device 102 hashes $H^B_1$ from the third message (i.e., $H(H^B_1)$) and compares the hash value to the hash value of $H^B_2$ stored in memory. When the two hash values are the same, the receiving device 102 authenticates the third message as being sent from the same sender of the second message. The receiving device 102 stores $H^B_2$ so $H^B_2$ can be used to authenticate a next message from the sending device 100. The above process continues for successive messages.

In the above example, by sending tokens of different generations from different seeds, the receiving device 102 can alternate between the hashes of the different seeds for authenticating a message while storing the other seed for authenticating the next message, and the sending device 100 only has to store the value of one hash seed for the next message, thus reducing storage requirements. In addition, by using two hash seeds in this way, instead of one, the sending device 100 can reduce the hash computations by generating shorter hash chains (e.g., a hash chain of 2 generations as described) without having to go through a new initialization process locally and with the receiving device 102 every time the sending device 100 reaches the beginning of a hash chain because one hash chain will always be available for maintaining the sequences of messages.

In an embodiment, the messages are structured in such a way that the receiving device 102 can identify the hash value to use for authenticating the current message from the hash value stored for authenticating the next message (e.g., by location or by labeling in the message). Alternatively, in an embodiment, the receiving device 102 could try authenticating the current message using both tokens in a message. At most one of the hash tokens in the message should authenticate the message and if one of the hash token does authenticate the message, the receiving device 102 stores the other hash token for authenticating the next message. Using this embodiment, the sending device 100 need only remember one hash value for a message sequence and need not remember a count of multiple recursive hash function applications. For each message, the sending device 100 needs to generate a new seed, say seed K for the Kth message, and either (1) use the hash function only once if seed K can be used as $H^K_1$ or (2) use the hash function twice to compute $H^K_1$ from seed K and then $H^K_2$ from $H^K_1$. This particular embodiment could be combined with a scheme to make message transmission more reliable, such as retransmission and acknowledgement, because it may be more difficult to recover from a lost message.

An important characteristic of this method is the inclusion in a message of more than one token where are least two tokens in a message are the result of a different number of recursive hash function applications to different seeds. The example embodiment above provided two tokens which were always the result of one or two applications of the hash function (or zero or one applications if the seed itself can be used a first-generation hash token).

In an embodiment, if the hash tokens being used are the result of a large number of applications of the hash function (i.e., greater than two), there need not be the same number of tokens in each message. For example, if a first message includes $H^K_{10}$ as a hash token, subsequent messages could have $H^K_9$, $H^K_8$, etc., until there is a message with both $H^K_1$ and $H^L_{10}$, etc., resulting in a sequence of 8 messages with a single token from series K, then one with the last token of series K and the first token of series L, followed by 8 messages with a single token from series L, and so on. Of course, each series could be of any length and the overlap between sequences could be more than one message. If the overlap in the hash token sequences is larger than 1, then this enables recovery from lost messages by the receiver trying more than one application of hash. In general, if there is an overlap of N in the hash token sequences, the receiver may be able to recover from up to N–1 lost messages.

Alternatively, every message, possibly after some start up, could have two tokens. For example, if sequences of 24 applications of the hash function were being used, the sending device 100 could send a message having tokens $H^K_{12}$ and $H^L_{24}$ in the message, the next message could have $H^K_{11}$ and $H^L_{23}$, etc., until a message with $H^K_1$ and $H^L_{13}$ is followed by a message with $H^L_{12}$ and $H^M_{24}$ and so on. Such a sequence of messages with two tokens per message may make the process of recovering from lost messages easier. In this case, recovery from up to 11 messages and the ability to authenticate the message with either token is possible, except when one token is the first token in a series from a new seed.

Figure 3:
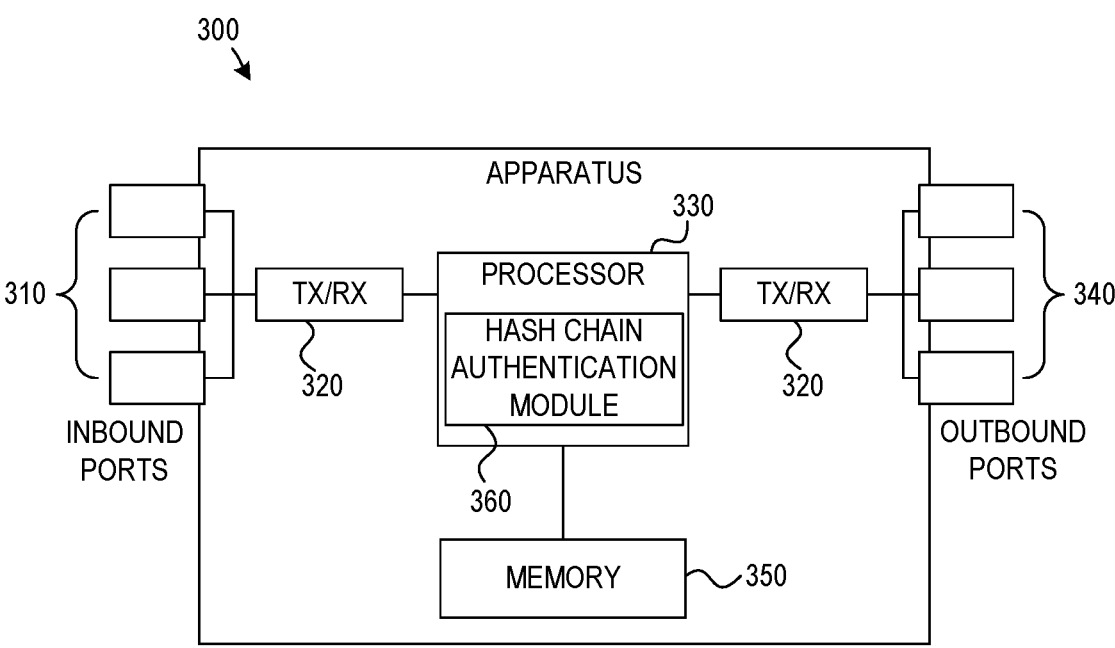
FIG. 3 is a schematic diagram of an apparatus for implementing an improved hash chaining authentication process according to an embodiment of the present disclosure.

FIG. 3 is a schematic diagram of an apparatus 300 configured to implement one or more of the methods disclosed herein according to an embodiment of the disclosure. For example, the apparatus 300 may represent the sending device 100 and/or the receiving device 102. The apparatus 300 comprises ingress ports 310 and receiver units (Rx) 320 for receiving messages, a processor, logic unit, or central processing unit (CPU) 330 to process the messages, transmitter units (TX) 320 and egress ports 340 for transmitting the messages, and a memory 350.

The processor 330 is implemented by any suitable combination of hardware, middleware, and firmware. The processor 330 may be implemented as one or more CPU chips, cores (e.g., as a multi-core processor), field-programmable gate arrays (FPGAs), application specific integrated circuits (ASICs), or digital signal processors (DSPs). The processor 330 is in communication with the ingress ports 310, receiver units 320, transmitter units 320, egress ports 340, and memory 350.

The memory 350 comprises one or more disks, tape drives, or solid-state drives and may be used as an over-flow data storage device, to store programs when such programs are selected for execution, or to store instructions and data that are read during program execution. The memory 350 may be volatile and/or non-volatile and may be read-only memory (ROM), random-access memory (RAM), ternary content-addressable memory (TCAM), or static random-access memory (SRAM). In one embodiment, the memory 350 comprises a hash chain authentication module 360. The hash chain authentication module 360 comprises executable instructions and data configurations that when executed by the processor 330 implements the disclosed embodiments as described herein.

While several embodiments have been provided in the present disclosure, it should be understood that the disclosed systems and methods might be embodied in many other specific forms without departing from the spirit or scope of the present disclosure. A person skilled in the art would understand how to combine any or all of the above techniques in a vast variety of permutations and combinations.

The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for authenticating messages implemented by a sending device, the method comprising:

generating, using a hash function, an N generation token of a first seed and an N−1 generation token of the first seed, wherein N is a firt integer value greater than one;

sending a first message that includes the N generation token of a first seed, wherein N is a first integer value greater than one; and sending a second message that includes the N−1 generation token of the first seed and an M generation token of a second seed, wherein M is a second integer value greater than one, and wherein the N−1 generation token is a different generation than the M generation token.

2. The method of claim 1, further comprising:

prior to sending the first message, generating the N−1 generation token and the N generation token of the first seed by performing hash chaining using the first seed; and storing the N−1 generation token.

3. The method of claim 1, further comprising:

prior to sending the second message, generating an M−1 generation token and the M generation token of the second seed by performing hash chaining using the second seed; and storing the M−1 generation token.

4. The method of claim 3, wherein the first integer value of N is equal to the second integer value of M.

5. The method of claim 4, further comprising sending, when N is greater than two and M is greater than two, a third message that includes an N−2 generation token of the first seed and the M−1 generation token of a second seed.

6. The method of claim 5, further comprising:

prior to sending the third message, generating an N−3 generation token and the N−2 generation token of the first seed by performing hash chaining using the first seed; and storing the N−3 generation token.

7. The method of claim 1, further comprising:

generating, when N is two and Mis two, an N−1 generation token and an N generation token of a third seed by performing hash chaining using the third seed;

sending a third message that includes an M−1 generation token of the second seed and the N generation token of the third seed; and storing the N−1 generation token of the third seed.

8. The method of claim 1, further comprising overwriting or deleting any previously stored generation token that has been included in a sent message.

9. A method for authenticating messages implemented by a receiving device, the method comprising:

receiving, from a sending device, a first message that includes an N generation token of a first seed, wherein N is a first integer value greater than one;

storing the N generation token of the first seed;

receiving, from the sending device, a second message that includes an N−1 generation token of the first seed and an M generation token of a second seed, wherein M is a second integer value greater than one, and wherein the N−1 generation token is a different generation than the M generation token;

determining whether a hash value of a hash of the N−1 generation token is equal to the N generation token of the first seed received in the first message; and authenticating that the second message came from the sending device when the hash value of the hash of the N−1 generation token is equal to the N generation token received in the first message.

10. The method of claim 9, further comprising discarding the second message when the hash value of the hash of the N−1 generation token is not equal to the N generation token received in the first message.

11. The method of claim 9, further comprising storing the M generation token of the second seed when the hash value of the hash of the N−1 generation token is equal to the N generation token received in the first message.

12. The method of claim 9, further comprising deleting or overwriting the N generation token of the first seed from memory when the hash value of the hash of the N−1 generation token is equal to the N generation token received in the first message.

13. The method of claim 9, wherein the first integer value of N is equal to the second integer value of M.

14. The method of claim 9, further comprising:

receiving, when N is greater than two and M is greater than two, a third message that includes an N−2 generation token of the first seed and an M−1 generation token of the second seed;

determining whether the hash value of the hash of the M−1 generation token is equal to the M generation token; and authenticating that the third message came from the sending device when the hash value of the hash of the M−1 generation token is equal to the M generation token.

15. The method of claim 14, further comprising storing the N−2 generation token of the first seed for authenticating a fourth message from the sending device.

16. An apparatus comprising:

a memory configured to store instructions; and a processor coupled to the memory and configured to execute the instructions, which when executed cause the apparatus to:

generate, using a hash function, an N generation token of a first seed and an N−1 generation token of the first seen, wherein N is a first integer value greater than one;

send a first message that includes the N generation token of a first seed, wherein N is a first integer value greater than one; and send a second message that includes the N−1 generation token of the first seed and an M generation token of a second seed, wherein M is a second integer value greater than one, and wherein the N−1 generation token is a different generation than the M generation token.

17. The apparatus of claim 16, wherein the instructions when executed by the processor, further causes the apparatus to:

generate, prior to sending the first message, the N−1 generation token and the N generation token of the first seed by performing hash chaining using the first seed; and store the N−1 generation token.

18. The apparatus of claim 16, wherein the instructions when executed by the processor, further causes the apparatus to:

generate, prior to sending the second message, an M−1 generation token and the M generation token of the second seed by performing hash chaining using the second seed; and store the M−1 generation token.

19. The apparatus of claim 18, wherein the first integer value of N is equal to the second integer value of M.

20. The apparatus of claim 19, wherein the instructions when executed by the processor, further causes the apparatus to send, when N is greater than two and M is greater than two, a third message that includes an N−2 generation token of the first seed and the M−1 generation token of a second seed.

21. The apparatus of claim 20, wherein the instructions when executed by the processor, further causes the apparatus to generate, prior to sending the third message, an N−3 generation token and the N−2 generation token of the first seed by performing hash chaining using the first seed; and store the N−3 generation token.

22. The apparatus of claim 16, wherein the instructions when executed by the processor, further causes the apparatus to:

generate, when N is two and M is two, an N−1 generation token and the N generation token of a third seed by performing hash chaining using the third seed;

send a third message that includes an M−2 generation token of the second seed and the N generation token of the third seed; and store the N−1 generation token of the third seed.

23. The apparatus of claim 16, wherein the instructions when executed by the processor, further causes the apparatus to overwrite or delete any previously stored generation token that has been included in a sent message.

24. A computer program product comprising computer-executable instructions stored on a non-transitory computer-readable storage medium, the computer-executable instructions when executed by one or more processors of an apparatus, cause the apparatus to:

receive, from a sending device, a first message that includes an N generation token of a first seed, wherein N is a first integer value greater than one;

store the N generation token of the first seed;

receive a second message that includes an N−1 generation token of the first seed and an M generation token of a second seed, wherein M is a second integer value greater than one, and wherein the N−1 generation token is a different generation than the M generation token;

determine whether a hash value of a hash of the N−1 generation token is equal to the N generation token of the first seed received in the first message; and authenticate that the second message came from the sending device when the hash value of the hash of the N−1 generation token is equal to the N generation token received in the first message.

25. The computer program product of claim 24, wherein the instructions when executed by the one or more processors, further causes the apparatus to discard the second message when the hash value of the hash of the N−1 generation token is not equal to the N generation token received in the first message.

26. The computer program product of claim 24, wherein the instructions when executed by the one or more processors, further causes the apparatus to store the M generation token of the second seed when the hash value of the hash of the N−1 generation token is equal to the N generation token received in the first message.

27. The computer program product of claim 24, wherein the instructions when executed by the one or more processors, further causes the apparatus to delete or overwrite the N generation token of the first seed from memory when the hash value of the hash of the N−1 generation token is equal to the N generation token received in the first message.

28. The computer program product of claim 24, wherein the first integer value of N is equal to the second integer value of M.

29. The computer program product of claim 24, wherein the instructions when executed by the one or more processors, further causes the apparatus to:

receive, when N is greater than two and M is greater than two, a third message that includes an N−2 generation token of the first seed and an M−1 generation token of the second seed;

determine whether the hash value of the hash of the M−1 generation token is equal to the M generation token; and authenticate that the third message came from the sending device when the hash value of the hash of the M−1 generation token is equal to the M generation token.

30. The computer program product of claim 29, wherein the instructions when executed by the one or more processors, further causes the apparatus to store the N−2 generation token of the first seed for authenticating a fourth message from the sending device.

* * * * *